United States Patent
Kato et al.

(10) Patent No.: US 10,922,248 B2
(45) Date of Patent: Feb. 16, 2021

(54) SLAVE DEVICE AND HOST DEVICE

(71) Applicant: Panasonic Intellectual Property Management Co., Ltd., Osaka (JP)

(72) Inventors: Isao Kato, Osaka (JP); Osamu Shibata, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/592,967

(22) Filed: Oct. 4, 2019

(65) Prior Publication Data
US 2020/0034317 A1 Jan. 30, 2020

Related U.S. Application Data

(63) Continuation of application No. PCT/JP2018/014484, filed on Apr. 4, 2018.

(30) Foreign Application Priority Data

Apr. 7, 2017 (JP) ............................. JP2017-076849
Sep. 29, 2017 (JP) ............................. JP2017-189359

(51) Int. Cl.
*G06F 13/16* (2006.01)
*G06F 1/26* (2006.01)
*G06F 13/42* (2006.01)

(52) U.S. Cl.
CPC .......... *G06F 13/1668* (2013.01); *G06F 1/266* (2013.01); *G06F 13/4282* (2013.01); *G06F 2213/0026* (2013.01)

(58) Field of Classification Search
CPC .. G06F 1/266; G06F 13/1668; G06F 13/4282; G06F 2213/0026
See application file for complete search history.

(56) References Cited

U.S. PATENT DOCUMENTS

2006/0095608 A1* 5/2006 Seto .................. G06F 5/065
710/52
2007/0255855 A1* 11/2007 Knapp .............. H04J 3/0605
709/248

(Continued)

FOREIGN PATENT DOCUMENTS

JP 2015-180980 10/2015
JP 2016-167167 9/2016

OTHER PUBLICATIONS

International Search Report dated Jun. 19, 2018 in corresponding International Application No. PCT/JP2018/014484.

(Continued)

*Primary Examiner* — Henry Tsai
*Assistant Examiner* — John B Roche
(74) *Attorney, Agent, or Firm* — Wenderoth, Lind & Ponack, L.L.P.

(57) ABSTRACT

A slave device is to be connected to a host device through at least one of a first interface and a second interface. The slave device includes a first terminal group used for the first interface, a second terminal group used for the second interface and a signal input and output part. The first terminal group and the second terminal group are provided at positions identical to terminal groups of another slave device to be connected through a third interface different from the second interface. The signal input and output part supplies a signal to a predetermined terminal in the first terminal group within a predetermined period from supply of power to the slave device, the signal notifying the host device whether the second terminal group is compliant with the second interface.

16 Claims, 14 Drawing Sheets

(56) References Cited

U.S. PATENT DOCUMENTS

2015/0248368 A1* 9/2015 Otsuka ................ G06F 13/4068
711/115
2016/0266794 A1* 9/2016 Ishibashi ................. G06F 3/061

OTHER PUBLICATIONS

SD Card Association, SD specifications part 1 physical layer simplified specification version. 5.00, [online], Aug. 10, 2016, [retrieved on Jun. 6, 2018], pp. 25-32, Internet:<URL:http://www.sdcard.org>.

* cited by examiner

SLAVE DEVICE AND HOST DEVICE

BACKGROUND

1. Technical Field

The present disclosure relates to a slave device and a host device that can be connected to each other.

2. Description of the Related Art

In recent years, slave devices, such as a card-shaped secure digital (SD) card or a CompactFlash (Registered Trademark), that include a large-volume non-volatile storage element such as a flash memory and enables high-speed data processing are widespread on the market. Such a slave device is used while being attached to a host device such as a personal computer, a smartphone, a digital camera, an audio player, or a car navigation system (see PTL 1: Unexamined Japanese Patent Publication No. 2016-167167).

SUMMARY

Examples of an SD card, which is one kind of slave device, includes a card that supports a single-end (legacy, low voltage (LV)) interface and a card that supports an ultra high speed (UHS)-II interface that realizes increased transmission speed by using a differential signal. Furthermore, it is desired that a peripheral component interconnect (PCI) Express (Registered Trademark) (PCIe) that is a general-purpose interface be introduced into an SD card.

However, in a case where a slave device is connected to a host device while allocating a newly introduced interface to an existing terminal group for interface due to restrictions of a card shape and a card size, the host device cannot normally perform communication without identification of a type of interface for connection with the slave device and without matching of the type of interface.

If the host device starts communication without matching of the type of interface, there is a risk of occurrence of a problem such as a failure or breakage of an interface circuit of the slave device.

The present disclosure was accomplished in view of the above problems and provides a slave device and a host device that make it possible for the host device to easily identify whether or not the slave device is connected to the host device through a newly introduced interface.

A slave device according to the present disclosure is to be connected to a host device through at least one of a first interface and a second interface. The slave device includes a first terminal group used for the first interface, a second terminal group used for the second interface and a signal input and output part. The first terminal group and the second terminal group are provided at positions identical to terminal groups of another slave device to be connected through a third interface different from the second interface. The signal input and output part supplies a signal to a predetermined terminal in the first terminal group within a predetermined period from supply of power to the slave device, the signal notifying the host device whether the second terminal group is compliant with the second interface.

A slave device according to the present disclosure is to be connected to a host device through at least one of a first interface and a second interface, The slave device includes a first terminal group is used for the first interface, a second terminal group used for the second interface and a signal input and output part. The first terminal group and the second terminal group are provided at positions identical to terminal groups of another slave device to be connected through a third interface different from the second interface. The signal input and output part, in a case where power is supplied to the slave device and it is detected that a signal level of a predetermined first terminal is a predetermined level, supplies a signal to a second terminal in the first terminal group different from the predetermined first terminal, the signal notifying the host device whether the second terminal group is compliant with the second interface.

A slave device according to the present disclosure is to be connected to a host device through a first interface. The slave device includes a first terminal group and a second terminal. The first terminal group is provided at a position identical to a terminal group of another slave device to be connected through a second interface different from the first interface. The second terminal is provided at a position different from the first terminal group and is used for a determination whether the slave device is compliant with the first interface.

A host device according to the present disclosure is to be connected to a slave device through at least one of a first interface and a second interface. The host device includes a signal input and output part and a determining part. The signal input and output part is connected to a first terminal group and a second terminal group that are provided at positions identical to terminal groups of another slave device to be connected through a third interface different from the second interface and keeps a voltage level of a predetermined terminal in the first terminal group constant or changes the voltage level. The determining part determines whether an interface connected to the slave device is the second interface, based on a signal received from the slave device through the signal input and output part.

According to the present disclosure, a host device can easily identify whether or not a slave device is connected to the host device through a newly introduced interface.

DETAILED DESCRIPTION

Exemplary Embodiments

Exemplary embodiments are described in detail below with reference to the drawings as appropriate. However, description that is more detailed than necessary may be omitted. For example, a detailed description of a well-known matter and a repeated description of substantially the same configuration will be omitted in some cases. This is to avoid unnecessary redundancy in the following description and to facilitate understanding by those skilled in the art. It is assumed that constituent elements given identical reference signs have identical functions in each of the exemplary embodiments.

Note that the present disclosure provides the accompanying drawings and the following description in order to allow those skilled in the art to understand the present disclosure, and does not intend to limit the subject matter as described in the appended claims.

First Exemplary Embodiment 1-1. Pin Layout of Slave Device

Figure 1:
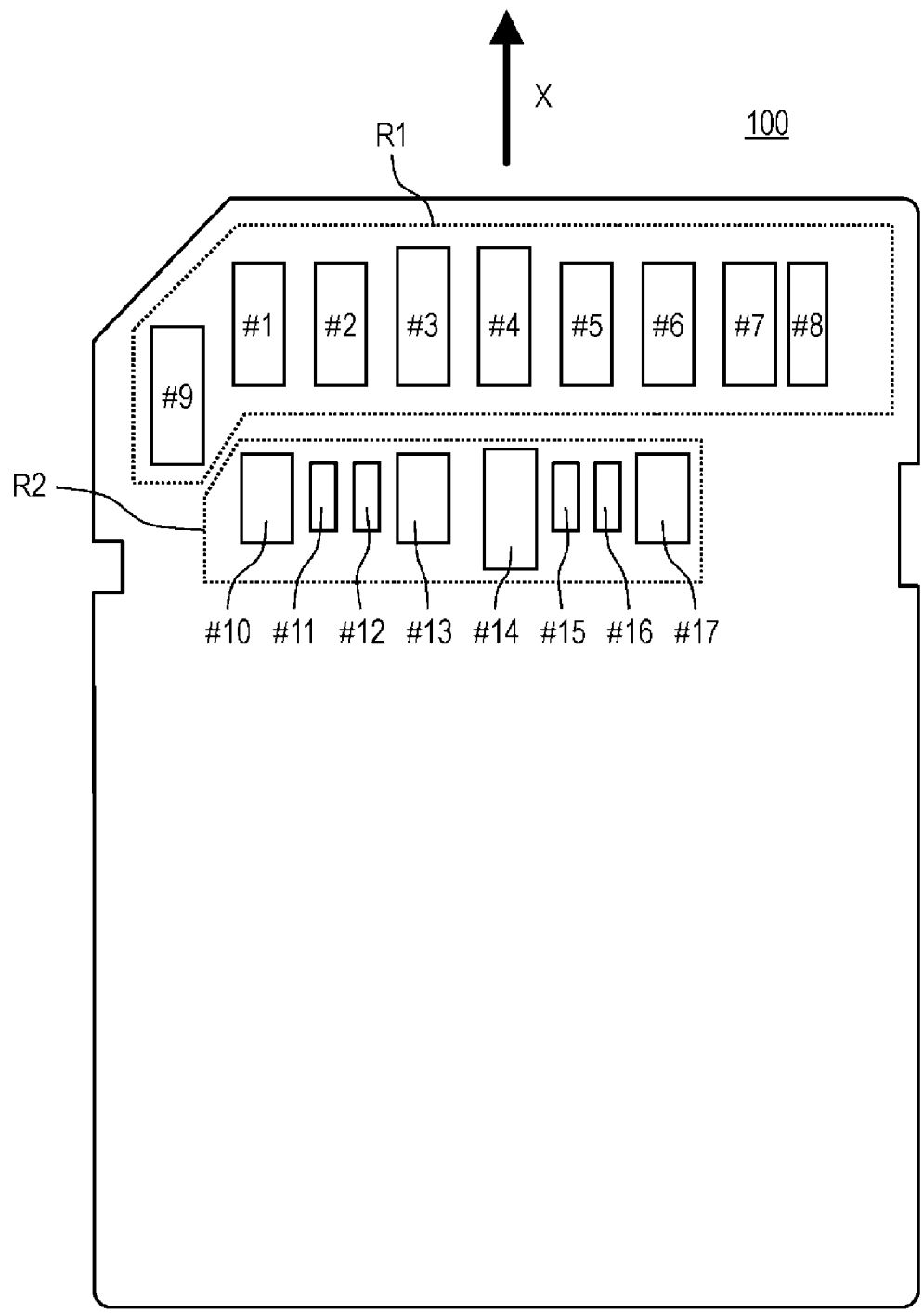
FIG. 1 illustrates an example of pin layout of a slave device according to a first exemplary embodiment.

FIG. 1 illustrates an example of pin layout of slave device 100 according to a first exemplary embodiment.

Slave device 100 according to the first exemplary embodiment illustrated in FIG. 1 is an SD card that is compliant with a legacy interface (legacy I/F) standard and a UHS-II I/F standard or a PCIe I/F standard as an interface with a host device.

Slave device 100 is inserted into the host device in a direction indicated by arrow X.

In slave device 100 illustrated in FIG. 1, 17 terminals (PIN #1 to PIN #17) each corresponding to a power supply line, a ground line, or a signal line are arranged.

PIN #1 to PIN #17 of slave device 100 are arranged in two rows, i.e., a first row substantially perpendicular to an insertion direction (arrow X) in which slave device 100 is inserted into the host device and a second row that is on a near side relative to the first row in the insertion direction.

Specifically, PIN #1 to PIN #9 are provided in region R1 (the first row) on a front-end side of slave device 100, and PIN #10 to PIN #17 are provided in region R2 (the second row) different from region R1. The PINs in region R1 and the PINs in region R2 form two rows.

The terminal group in region R1 is a terminal group that is compliant with the legacy I/F. The terminal group in region R2 is a terminal group that is compliant with the UHS-II I/F or PCIe I/F standard.

Slave device 100 transmits an identifying signal for causing the host device to identify whether or not the terminal group in region R2 is compliant with the PCIe I/F standard by using a signal line formed through a predetermined pin included in the terminal group in region R1, i.e., the pins for the legacy I/F when slave device 100 is connected to the host device.

Hereinafter, a signal line used to transmit an identifying signal indicative of compliance with the PCIe I/F standard to the host device is referred to as a "line for identifying signal".

Slave device 100 and the host device transmit and receive various signals (e.g., a control signal) to and from each other on the line for identifying signal after completion of interface initialization.

For example, slave device 100 and the host device may transmit and receive a signal requesting reset, a signal requesting a reference clock signal, a signal for power management, or an interrupt signal on the line for identifying signal.

1-2. Configuration and Operation of Removable System According to First Exemplary Embodiment

[1-2-1. Configuration]

Figure 2:
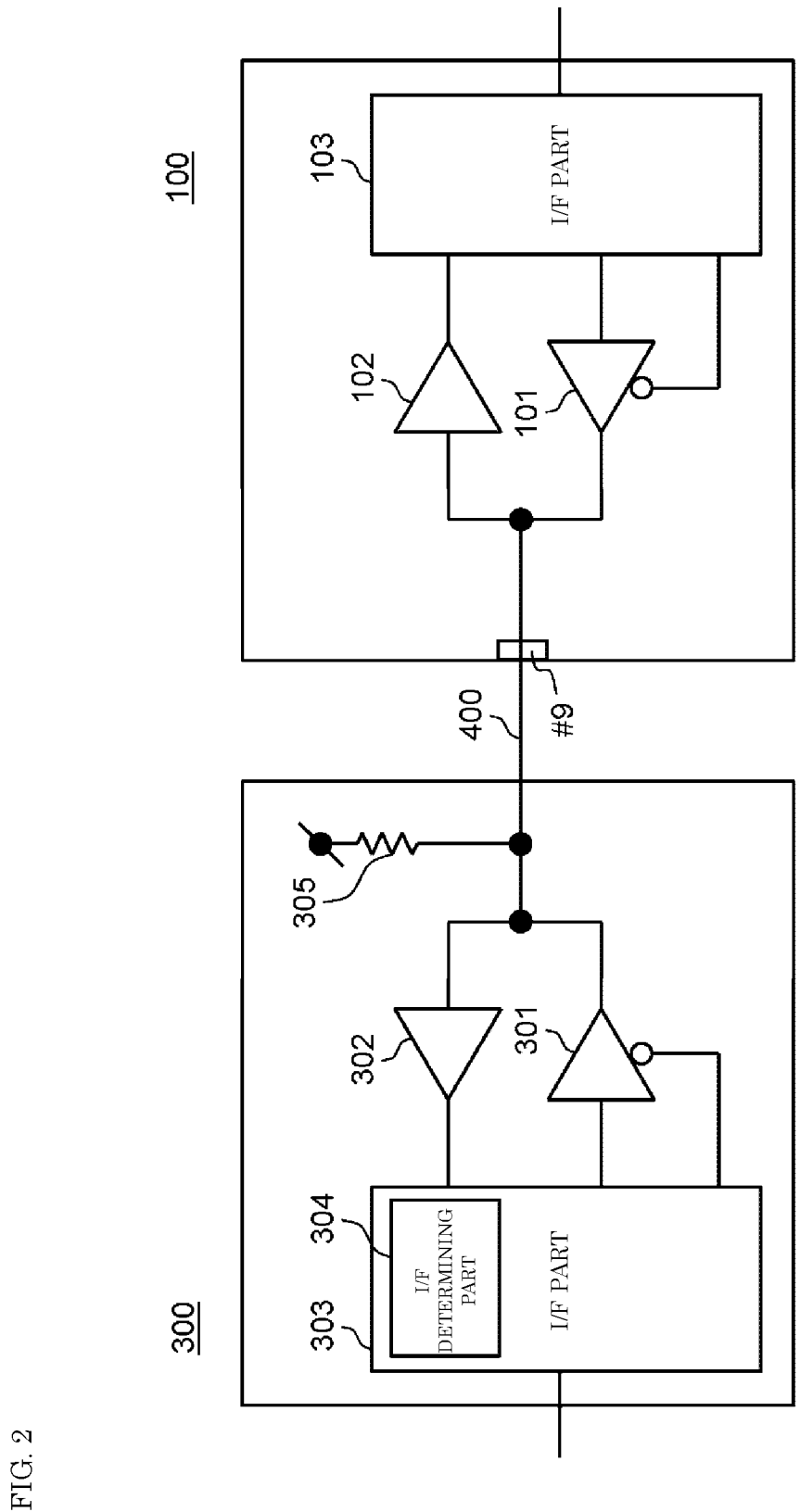
FIG. 2 is a block diagram for explaining a configuration, on a line for identifying signal, of a removable system in which a host device and a slave device are connected according to the first exemplary embodiment.

FIG. 2 is a block diagram for explaining a configuration, on the line for identifying signal, of a removable system in which host device 300 and slave device 100 are connected according to the first exemplary embodiment.

All signal lines passing PIN #1 to PIN #17 of slave device 100 are formed (not illustrated) during connection between host device 300 and slave device 100.

Slave device 100 has output buffer 101, input buffer 102, and interface (I/F part) 103 that are connected to line for identifying signal 400.

Host device 300 has output buffer 301, input buffer 302, I/F part 303, I/F determining part 304, and pull-up resistor 305 that are connected to line for identifying signal 400.

After power activation of slave device 100, slave device 100 and host device 300 transmit and receive a signal to and from each other by using line for identifying signal 400. This allows host device 300 to identify whether or not slave device 100 is compliant with PCIe. The transmission and reception of a signal on line for identifying signal 400 will be described later.

Although I/F part 103 and I/F part 303 are connected to each other through all of PIN #1 to PIN #17 of slave device 100, illustration of the PINs other than PIN #9 is omitted.

Although an example in which PIN #9 in region R1 (the first row) is used for line for identifying signal 400 is described in the first exemplary embodiment, this is merely an example, and the present disclosure is not limited to this. For example, any terminal in region R1 (the first row) excluding a power supply terminal and a ground terminal, for example, PIN #7 or PIN #8 may be used.

Output buffer 301 of host device 300 has a function of changing a voltage level of PIN #9, and input buffer 302 of host device 300 has a function of transmitting the voltage level of PIN #9 to I/F part 303.

I/F determining part 304 has a function of determining whether or not slave device 100 is compliant with the PCIe I/F standard.

[1-2-2. Flow of Signal]

Figure 3:
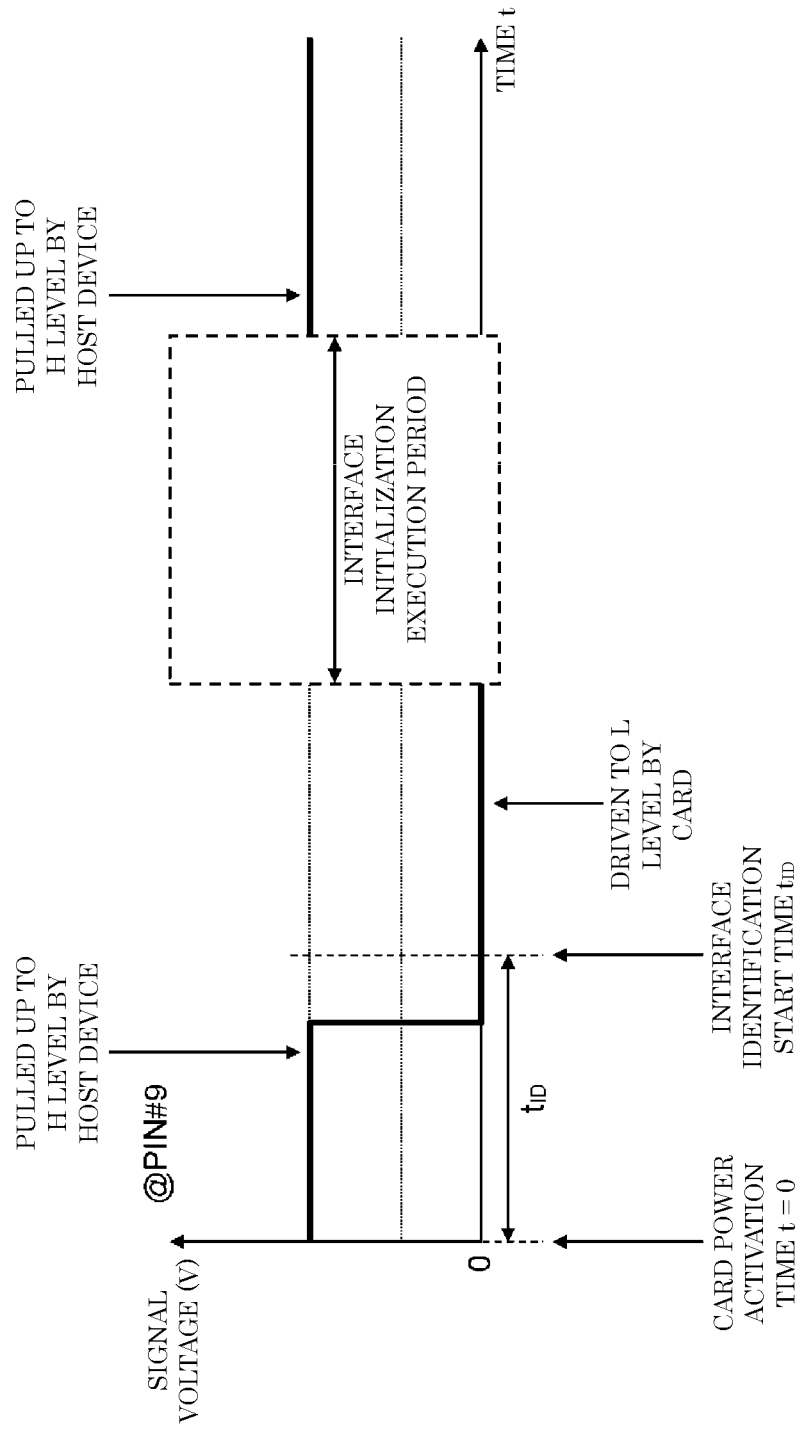
FIG. 3 illustrates a first example of a signal on the line for identifying signal according to the first exemplary embodiment.
Figure 4:
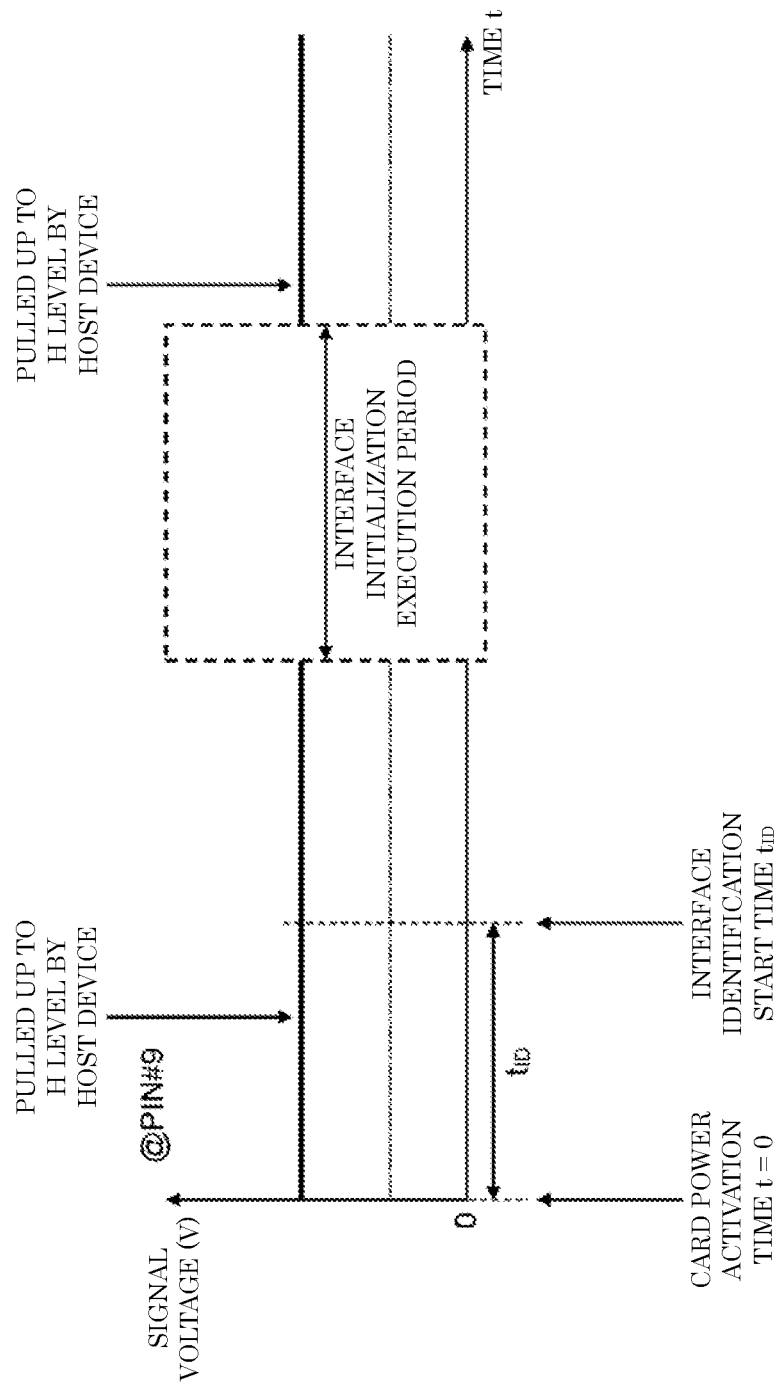
FIG. 4 illustrates a second example of a signal on the line for identifying signal according to the first exemplary embodiment.

FIGS. 3 and 4 illustrate an example of a signal on line for identifying signal 400 according to the first exemplary embodiment.

In FIGS. 3 and 4, the vertical axis represents a signal voltage on the line for identifying signal, i.e., PIN #9, and the horizontal axis represents a time.

The line for identifying signal is pulled up to a high level (H level) by pull-up resistor 305 (see FIG. 2) after power activation of host device 300. Then, after detecting insertion of slave device 100, host device 300 supplies power to slave device 100 and starts identification of an interface of slave device 100.

Slave device 100 that is compliant with the PCIe I/F drives PIN #9 to a low level (L level) within predetermined period tin from the power supply (see FIG. 3).

Meanwhile, slave device 100 that is not compliant with the PCIe I/F and is compliant with the UHS-II I/F and a slave device that is not compliant with the PCIe I/F nor the UHS-II I/F and includes only the legacy I/F do not drive PIN #9 to the L level nor the H level after the power supply until interface initialization is completed. Accordingly, the line for identifying signal is maintained at the H level by pull-up resistor 304 of host device 300 (see FIG. 4).

Host device 300 waits for elapse of predetermined period tin from start of the power supply to slave device 100, checks a signal level of the line for identifying signal at interface identification start time $t_{ID}$ or thereafter, and determines that slave device 100 is compliant with the PCIe I/F in a case where the signal level is the L level (the signal voltage is 0V).

In the present disclosure, a state where a signal is an L level is a state where a voltage of the signal is 0V or close to 0V and generally means 0. Meanwhile, a state where a signal is an H level is a state where a voltage of the signal is higher than the L level and is easily distinguishable from a signal of the L level and generally means 1.

In a case where the signal level of the line for identifying signal (PIN #9) is the L level, host device 300 determines that slave device 100 is compliant with the PCIe I/F and executes initialization of the PCIe I/F during an interface initialization execution period illustrated in FIG. 3.

The initialization of the PCIe I/F is executed by using a signal line formed through PIN #10 to PIN #17 provided in region R2 (the second row) of slave device 100.

Note that the initialization of the PCIe I/F may be executed by using not only the signal line formed through PIN #10 to PIN #17 provided in region R2 (the second row) of slave device 100, but also one or more of PIN #1 to PIN #9 provided in region R1 (the first row) of slave device 100.

Slave device 100 stops driving of PIN #9 to the L level in the process of initialization of the PCIe I/F executed by host device 300. As a result, the line for the identifying signal is maintained at the H level by pull-up resistor 305 of host device 300.

The signal illustrated in FIGS. 3 and 4 is merely an example, and the present disclosure is not limited to this. Although an example in which slave device 100 that is compliant with the PCIe I/F drives the line for identifying signal to the L level has been described, host device 300 and slave device 100 may execute PCIe I/F identification by handshake using the line for identifying signal.

[1-2-3. Initialization Process]

Figure 5:
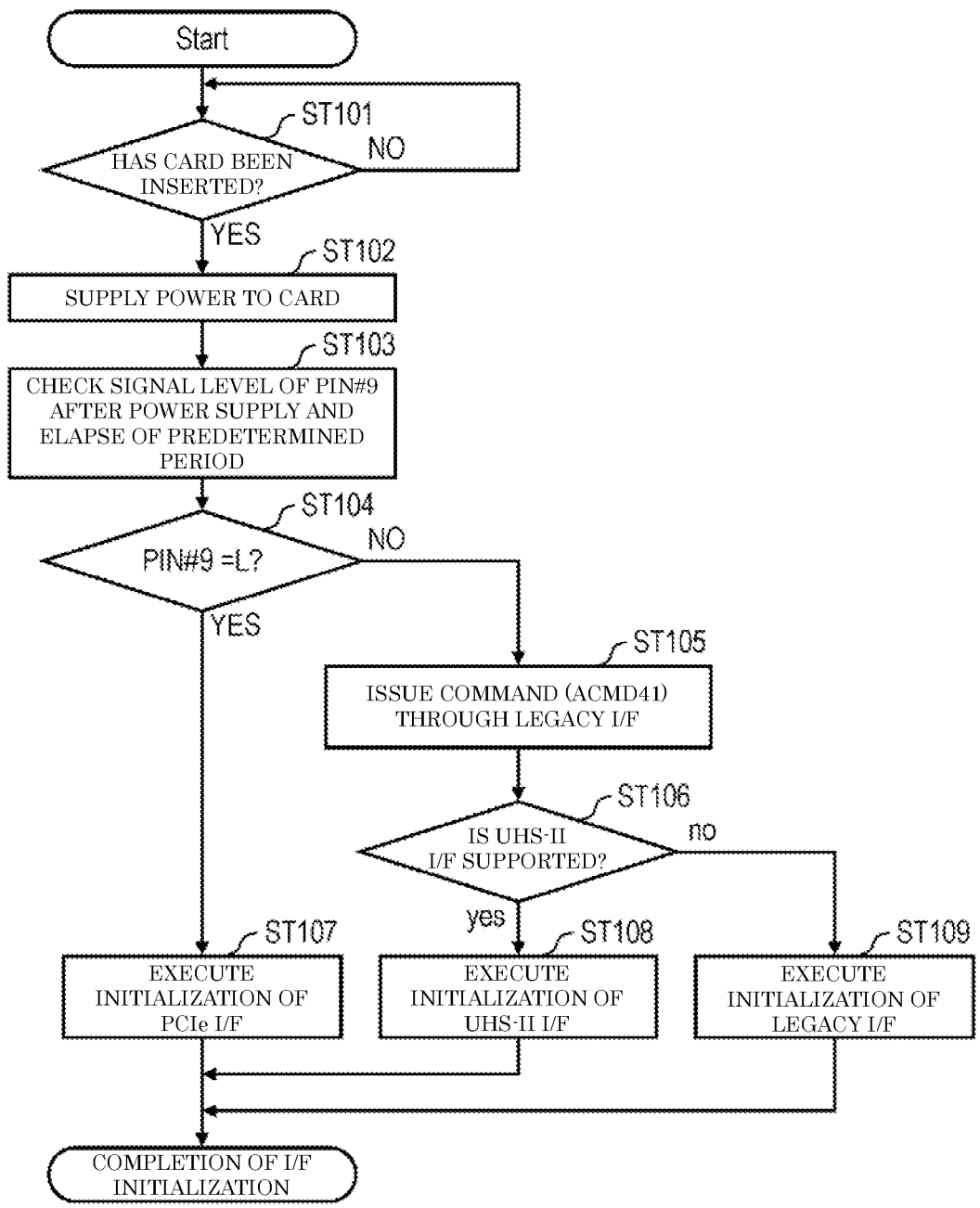
FIG. 5 is a flowchart illustrating an example of an initialization process of the host device according to the first exemplary embodiment.

FIG. 5 is a flowchart illustrating an example of an initialization process of a host device according to the first exemplary embodiment.

Operation in ST107, ST108, and ST109 illustrated in FIG. 5 is operation of initialization of an interface with a slave device executed by the host device during the "interface initialization execution period" illustrated in FIG. 4.

First, host device 300 determines whether or not a slave device (SD card) has been inserted (ST101). In this determining process, for example, a removal detection part provided in an SD card connector of host device 300 detects whether a slave device has been removed or inserted.

In a case where a slave device has not been inserted (NO in ST101), host device 300 performs the operation in ST101 again.

In a case where a slave device has been inserted (YES in ST101), host device 300 supplies power to the slave device (ST102).

A timing at which host device 300 supplies power to the slave device is generally after detection of insertion of the slave device from the perspective of energy saving, but the host device may supply power to the slave device before detection of insertion of the slave device.

Next, host device 300 waits for elapse of predetermined period $t_{ID}$ from start of the power supply to the slave device and checks a signal level of PIN #9, i.e., the line for identifying signal at interface identification start time tin or thereafter (ST103).

In a case where the signal level of PIN #9 is L (YES in ST104), host device 300 determines that the inserted slave device is compliant with the PCIe I/F standard and executes initialization using the PCIe I/F (ST 107). Then, the operation flow of the initialization ends.

Meanwhile, in a case where the signal level of PIN #9 is not L (NO in ST104), host device 300 determines that the inserted slave device is not compliant with the PCIe I/F standard. In this case, the host device issues a command of the legacy I/F through the terminal group (PIN #1 to PIN #9) of region R1 in order to check whether or not the slave device is compliant with the UHS-II I/F standard (ST105).

Host device 300 checks a response from the slave device (SD card) to the command issued in ST105, and in a case where the slave device is compliant with the UHS-II I/F standard (YES in ST106), host device 300 executes initialization using the UHS-II I/F (ST108). Then, the operation flow of the initialization ends.

Host device 300 checks a response from the slave device (SD card) to the command issued in ST105, and in a case where the slave device is not compliant with the UHS-II I/F standard (NO in ST106), host device 300 executes initialization using the legacy I/F (ST109). Then, the operation flow of the initialization ends.

Through the above operation flow, the host device can determine an interface supported by the inserted slave device and can execute initialization according to the determination.

1-3. Effects

According to the first exemplary embodiment, slave device 100 is a slave device that is to be connected to a host device through at least one of a legacy I/F (a first interface) and a PCIe I/F (a second interface) and includes PIN #1 to PIN #9 (a first terminal group) and PIN #10 to PIN #17 (a second terminal group) that are provided at positions identical to PIN #1 to PIN #9 (a first terminal group) and PIN #10 to PIN #17 (a second terminal group) of a slave device to be connected through at least one of a legacy I/F (a first interface) and a UHS-II I/F (a third interface). The legacy I/F (the first interface) is allocated to PIN #1 to PIN #9 (the first terminal group), and the PCIe I/F (the second interface) or the UHS-II I/F (the third interface) is allocated to PIN #10 to PIN #17 (the second terminal group).

According to this configuration, the slave device outputs a signal for causing the host device to identify whether or not the slave device is compliant with the PCIe I/F through a specific terminal of the legacy I/F (PIN #1 to PIN #9) common to the slave device that is compliant with the PCIe I/F and the slave device that is compliant with the UHS-II I/F. This allows the host device to easily identify whether or not the slave device is compliant with the PCIe I/F without newly adding a terminal for identifying signal.

Furthermore, after completing interface initialization, slave device 100 can transmit and receive a signal such as a signal requesting reset, a signal requesting a reference clock signal, a signal for power management, or an interrupt signal through PIN #9. This can assist transmission and reception of a signal through PIN #10 to PIN #17, thereby achieving high-speed data transmission.

Although a case where PIN #9 is used as a terminal for transmission and reception of a signal has been described in the first exemplary embodiment, the present disclosure is not limited to this. For example, any terminal in region R1 (the first row) excluding a power supply terminal and a ground terminal, for example, PIN #7 or PIN #8 may be used.

Second Exemplary Embodiment

[2-1. Pin Layout of Slave Device]

Figure 6:
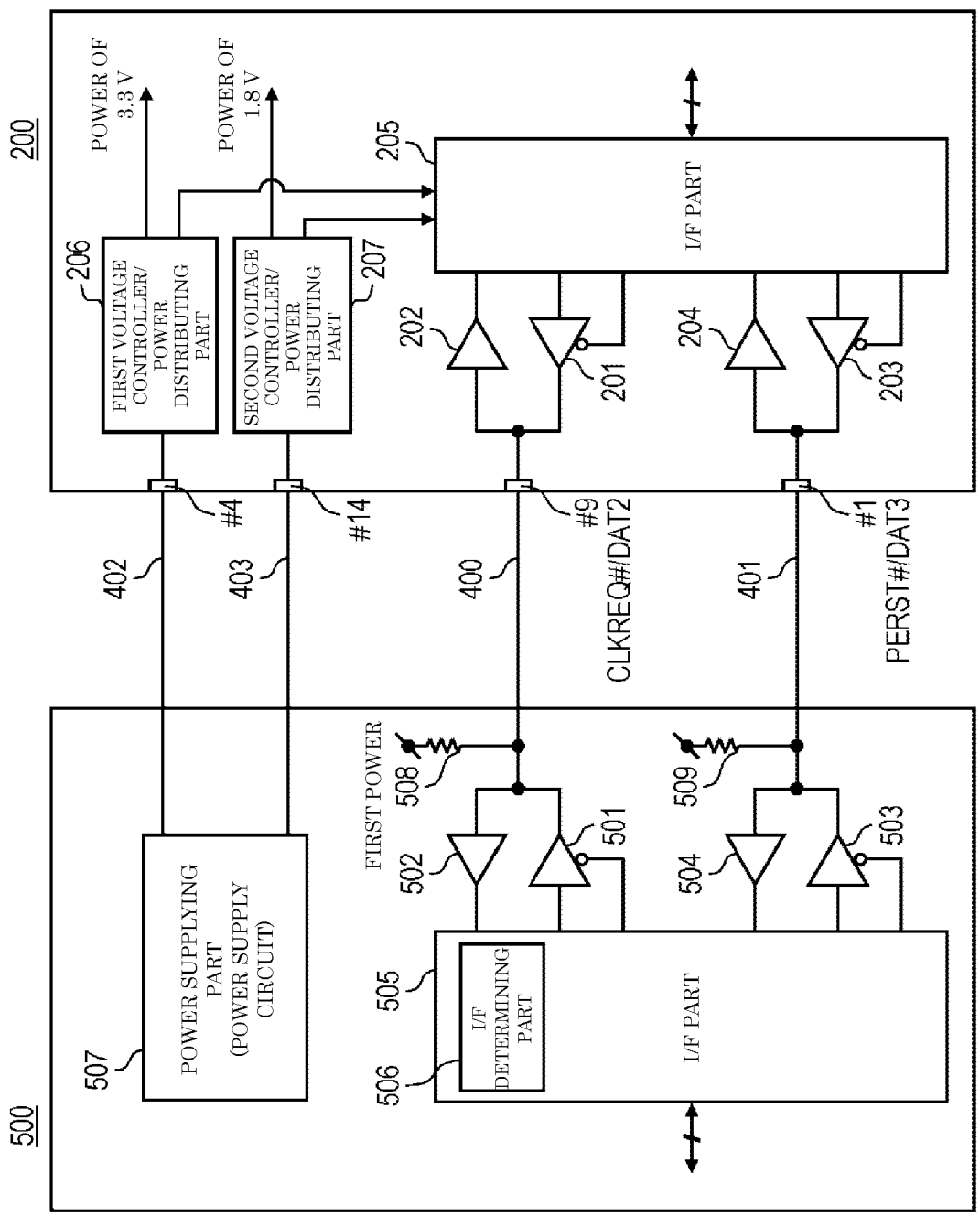
FIG. 6 is a block diagram for explaining a configuration, on a line for identifying signal, of a removable system in which a host device and a slave device are connected according to a second exemplary embodiment.

FIG. 6 is a block diagram for explaining a configuration, on a line for identifying signal, of a removable system in which a host device and a slave device are connected according to a second exemplary embodiment. Pin layout of slave device 200 according to the second exemplary embodiment is similar to the pin layout of slave device 100 illustrated in FIG. 1, and therefore detailed description thereof is omitted.

[2-2. Configuration and Operation of Removable System]

[2-2-1. Configuration]

Slave device 200 has output buffer 201 and input buffer 202 that are connected to line for identifying signal 400, output buffer 203 and input buffer 204 that are connected to line for reset requesting signal 401 for requesting reset from host device 500, I/F part 205, first voltage controller/power distributing part 206 that always outputs a constant voltage upon receipt of first power supplied from host device 500 even in a case where an input voltage and an output current change or distributes the first power to a necessary circuit part, and second voltage controller/power distributing part 207 that always outputs a constant voltage upon receipt of second power supplied from host device 500 even in a case where an input voltage and an output current change or distributes the second power to a necessary circuit part.

First voltage controller/power distributing part 206 and second voltage controller/power distributing part 207 may be configured not to have the function of always outputting a constant voltage even in a case where an input voltage and an output current change and may, for example, distribute power supplied from host device 500 directly to a necessary circuit part.

Host device 500 has output buffer 501 that is connected to line for identifying signal 400, input buffer 502, output buffer 503 that is connected to line for reset requesting signal 401 requesting reset from slave device 200, input buffer 504, I/F part 505, I/F determining part 506, power supplying part 507 that supplies one type of power, two types of power, or three types of power to slave device 200, pull-up resistor 508, and pull-up resistor 509.

Although an example in which host device 500 supplies two types of power to slave device 200 is described in the second exemplary embodiment, this is merely an example, and the present disclosure is not limited to this. The host device may supply one type power or may supply three types of power depending on a combination of host device and slave device.

After power activation of slave device 200, slave device 200 and host device 500 transmit and receive a signal to and from each other on line for identifying signal 400. This allows host device 500 to identify whether or not slave device 200 is compliant with PCIe.

The transmission and reception of a signal on line for identifying signal 400 will be described later.

Although I/F part 205 and I/F part 505 are connected through all of PIN #1 to PIN #17 of slave device 200, illustration of the PINs other than PIN #1, PIN #4, PIN #9, and PIN #14 is omitted.

Although an example in which PIN #9 in region R1 (a first row) is used for line for identifying signal 400 is described in the second exemplary embodiment, this is merely an example, and the present disclosure is not limited to this. For example, any terminal in region R1 (the first row) excluding a power supply terminal and a ground terminal, for example, PIN #7 or PIN #8 may be used.

Output buffer 501 of host device 500 has a function of changing a voltage level of PIN #9, and input buffer 502 of host device 500 has a function of transmitting the voltage level of PIN #9 to I/F part 505.

Similarly, output buffer 503 of host device 500 has a function of changing a voltage level of PIN #1, and input buffer 504 of host device 500 has a function of transmitting the voltage level of PIN #1 to I/F part 505.

I/F determining part 506 has a function of determining whether or not slave device 200 is compliant with the PCIe I/F standard.

Output buffer 201 of slave device 200 has a function of changing a voltage level of PIN #9, and input buffer 202 of slave device 200 has a function of transmitting the voltage level of PIN #9 to I/F part 205.

Similarly, output buffer 203 of slave device 200 has a function of changing a voltage level of PIN #1, and input buffer 204 of slave device 200 has a function of transmitting the voltage level of PIN #1 to I/F part 205.

[2-2-2. Flow of Signal]

Figure 7:
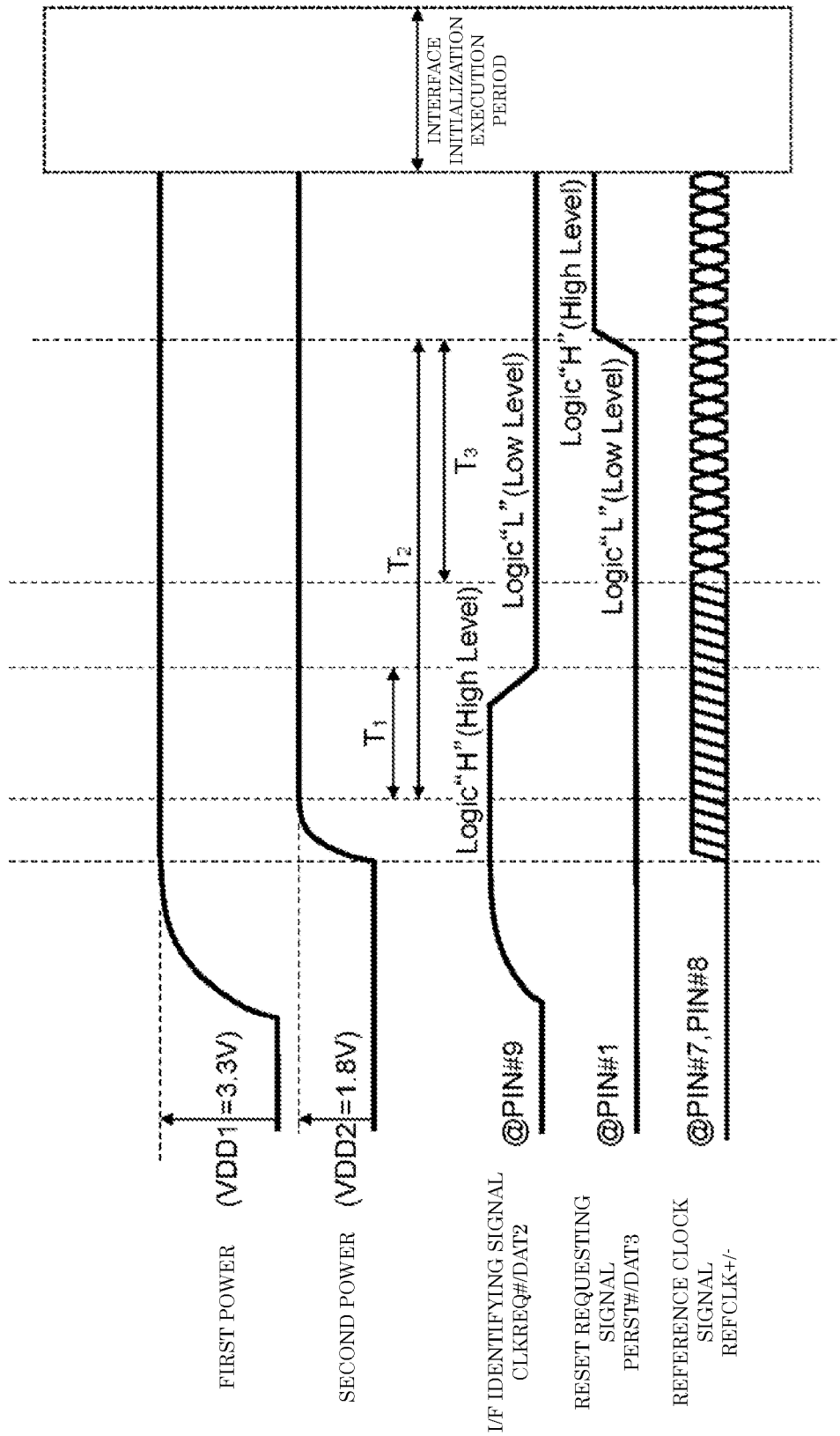
FIG. 7 illustrates an example of signals on a line for identifying signal according to the second exemplary embodiment.

FIG. 7 illustrates an example of signals on a line for identifying signal according to the second exemplary embodiment.

In FIG. 7, the vertical axis represents signal voltages of line for identifying signal 400 (PIN #9), line for reset requesting signal 401 (PIN #1), and a reference clock signal (PIN #7, PIN #8) and illustrate power-supply voltages of the first power (VDD1=3.3 V) and the second power (VDD2=1.8 V). In FIG. 7, the horizontal axis represents a time.

After detecting insertion of slave device 200, host device 500 drives a reset requesting signal (PIN #1) to an L level by using output buffer 503 and similarly drives a reference clock signal (PIN #7, PIN #8) to an L level by using an output buffer (not illustrated). Furthermore, host device 500 pulls up an I/F identifying signal (PIN #9) to a high level (H level) by using pull-up resistor 508 (see FIG. 6) and supplies the first power to slave device 200.

Host device 500 confirms that the reset requesting signal (PIN #1) is the L level and the I/F identifying signal (PIN #9) is the H level and supplies the second power to slave device 200.

Slave device 200 compliant with the PCIe I/F, which has received the second power and detected that the reset requesting signal (PIN #1) is the L level, drives the I/F identifying signal (PIN #9) to the L level within predetermined period T1 from the supply of the second power (see FIG. 7).

Meanwhile, a slave device that is not compliant with the PCIe I/F and is compliant with the UHS-II I/F and a slave device that is not compliant with the PCIe I/F nor the UHS-II I/F and includes only a legacy I/F do not drive the I/F identifying signal (PIN #9) to the L level after the power supply until interface initialization is completed. Accordingly, the line for identifying signal is maintained at the H level by pull-up resistor 508 of host device 500 (see FIG. 7).

Host device 500 waits for elapse of predetermined period T1 from start of the power supply to slave device 200, checks a signal level of the line for I/F identifying signal, and determines that slave device 200 is compliant with the PCIe I/F in a case where the signal is the L level (the signal voltage is 0V).

In the present disclosure, a state where a signal is an L level is a state where a voltage of the signal is 0V or close to 0V and generally means 0. Meanwhile, a state where a signal is an H level is a state where a voltage of the signal is higher than the L level and is easily distinguishable from a signal of the L level and generally means 1.

In a case where the signal level of the line for I/F identifying signal (PIN #9) is the L level, host device 500 determines that slave device 200 is compliant with the PCIe I/F and stops driving of the reset requesting signal (PIN #1) to the L level by output buffer 503 after predetermined period T2 from the start of supply of the power to slave device 200 and after T3 from stable supply of a reference clock.

Then, host device 500 executes initialization of the PCIe I/F during an interface initialization execution period illustrated in FIG. 7.

Initialization of the PCIe I/F is executed by using a signal line formed through PIN #10 to PIN #17 provided in region R2 (the second row) of slave device 200.

Note that initialization of the PCIe I/F may be executed by using not only the signal line formed through PIN #10 to PIN #17 provided in region R2 (the second row) of slave device 200, but also one or more of PIN #1 to PIN #9 provided in region R1 (the first row) of slave device 200.

Slave device 200 stops driving of the I/F identifying signal (PIN #9) to the L level in a process of initialization of the PCIe I/F executed by host device 500. As a result, the line for the identifying signal is maintained at the H level by pull-up resistor 508 of host device 500.

The signals illustrated in FIG. 7 are merely an example, and the present disclosure is not limited to this. Although an example in which slave device 200 that is compliant with the PCIe I/F drives the line for identifying signal to the L level has been described, host device 500 and slave device 200 may perform PCIe I/F by handshake using the line for identifying signal.

[2-2-3. Initialization Process]

Figure 8:
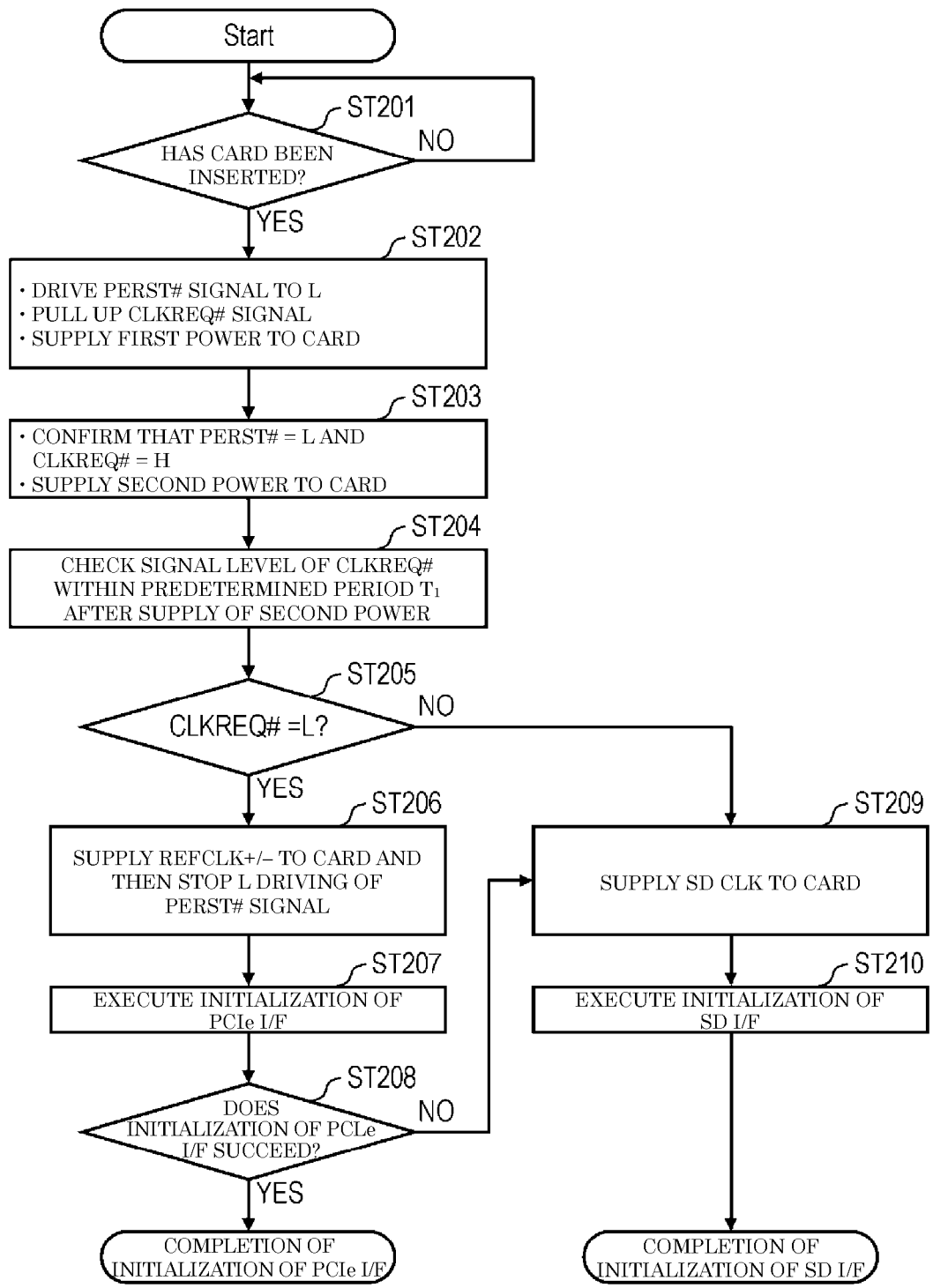
FIG. 8 is a flowchart illustrating an example of an initialization process of the host device according to the second exemplary embodiment.

FIG. 8 is a flowchart illustrating an example of the initialization process of the host device according to the second exemplary embodiment.

Operation in ST207 and ST210 illustrated in FIG. 8 is operation of initialization of an interface with the slave device executed by host device 500 during the "interface initialization execution period" illustrated in FIG. 7.

First, host device 500 determines whether or not a slave device (SD card) has been inserted (ST201). In this determining process, for example, a removal detection part provided in an SD card connector of the host device detects whether the slave device has been removed or inserted.

In a case where a slave device has not been inserted (NO in ST201), host device 500 performs the operation in ST201 again.

In a case where a slave device has been inserted (YES in ST201), host device 500 drives the reset requesting signal (PIN #1) to an L level by using output buffer 503 (see FIG. 6) and similarly drives the reference clock signal (PIN #7, PIN #8) to an L level by using an output buffer (not illustrated in FIGS. 6 and 8). Furthermore, host device 500 pulls up the I/F identifying signal (PIN #9) to an H level by using pull-up resistor 508 (see FIG. 6) and supplies first power to the slave device (ST202).

A timing at which host device 500 supplies power to the slave device is generally after detection of insertion of the slave device from the perspective of energy saving, but the host device may supply power to the slave device before detection of insertion of the slave device.

Next, host device 500 confirms that the reset requesting signal (PIN #1) is the L level and the I/F identifying signal (PIN #9) is the H level and supplies second power to slave device 200 (ST203).

Then, host device 500 waits for elapse of predetermined period T1 from start of supply of the second power to the slave device and checks a signal level of the line for I/F identifying signal (PIN #9) (ST204).

In a case where the signal level of the I/F identifying signal (PIN #9) is L (YES in ST205), host device 500 determines that the inserted slave device is compliant with the PCIe I/F and (in ST206) supplies reference clock signal +/− to the slave device and then stops the L level driving of the PERST # signal that was driven to an L level in (ST202) and executes initialization using the PCIe I/F (ST 207). In a case where the PCIe I/F initialization succeeds (YES in ST208), an operation flow of the initialization ends.

In a case where the PCIe I/F initialization fails (NO in ST208), a clock (SDCLK(PIN #5)) is supplied to the slave device (ST209), initialization of an SD I/F is executed (ST210), and an operation flow of the initialization ends.

Meanwhile, in a case where the signal level of the I/F identifying signal (PIN #9) is not L (NO in ST205), host device 500 determines that the inserted slave device is not compliant with the PCIe I/F. In this case, host device 500 supplies the clock (SDCLK(PIN #5)) to the slave device (ST209), executes initialization of the SD I/F (ST210), and then an operation flow of the initialization ends.

Through the above operation flow, host device 500 can determine an interface supported by the inserted slave device and can execute initialization according to the determination.

[2-4. Effects]

According to the second exemplary embodiment, slave device 200 is slave device 200 that is to be connected to host device 500 through at least one of a legacy I/F (a first interface) and a PCIe I/F (a second interface) and includes PIN #1 to PIN #9 (a first terminal group) and PIN #10 to PIN #17 (a second terminal group) that are provided at positions identical to PIN #1 to PIN #9 (a first terminal group) and PIN #10 to PIN #17 (a second terminal group) of slave device 200 that is connected through at least one of a legacy I/F (a first interface) and a UHS-II I/F (a third interface). The legacy I/F (the first interface) is allocated to PIN #1 to PIN #9 (the first terminal group), and the PCIe I/F (the second interface) or the UHS-II I/F (the third interface) is allocated to PIN #10 to PIN #17 (the second terminal group).

According to this configuration, slave device 200 outputs a signal for causing host device 500 to identify whether or not slave device 200 is compliant with the PCIe I/F through a specific terminal of the legacy I/F (PIN #1 to PIN #9) common to slave device 200 that is compliant with the PCIe I/F and slave device 200 that is compliant with the UHS-II I/F. This allows host device 500 to easily identify whether or not slave device 200 is compliant with the PCIe I/F without newly adding a terminal for identifying signal.

After completing interface initialization, slave device 200 can transmit and receive a signal requesting reset, a signal requesting a reference clock signal, a signal for power management, or an interrupt signal through PIN #9. This can assist transmission and reception of a signal through PIN #10 to PIN #17, thereby achieving high-speed data transmission.

Although a case where PIN #9 is used as a terminal for transmission and reception of a signal has been described in the second exemplary embodiment, the present disclosure is not limited to this. For example, any terminal in region R1 (the first row) excluding a power supply terminal and a ground terminal, for example, PIN #7 and PIN #8 may be used.

Third Exemplary Embodiment 3-1. Pin Layout of Slave Device According to Third Exemplary Embodiment FIG. 9 illustrates an example of pin layout of slave device 600 according to a third exemplary embodiment.

Figure 9:
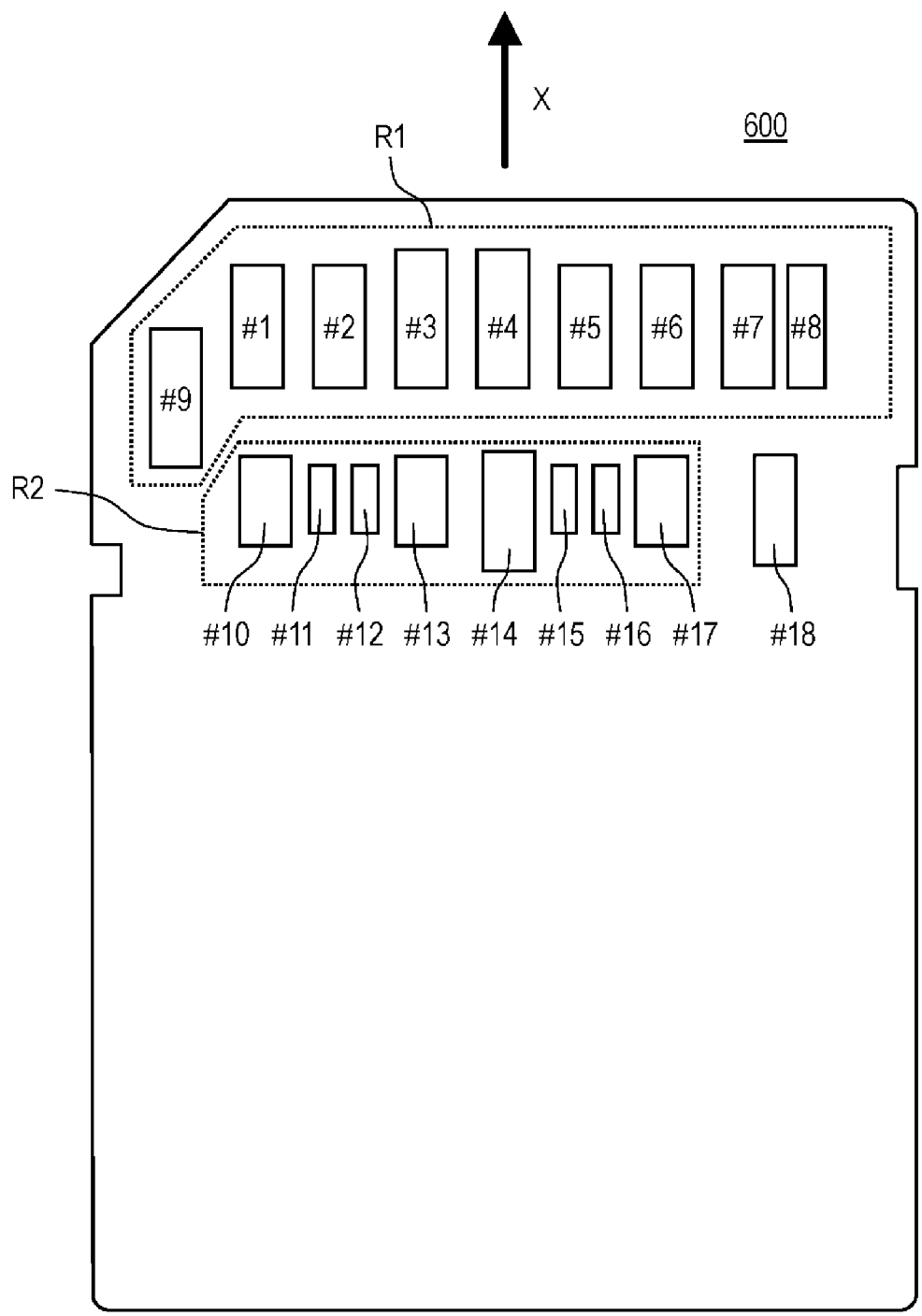
FIG. 9 illustrates an example of pin layout of a slave device according to a third exemplary embodiment.

Slave device 600 illustrated in FIG. 9 is an SD card that is compliant with a PCIe interface (hereinafter abbreviated as a PCIe I/F) standard, a UHS-II (Ultra High Speed-II) interface (hereinafter abbreviated as a UHS-II I/F) standard, and a 3.3 V single-end interface (hereinafter abbreviated as a legacy I/F) standard as an interface with a host device.

In slave device 600 illustrated in FIG. 9, 18 terminals (PIN #1 to PIN #18) each corresponding to a power supply line or a signal line are arranged. PIN #1 to PIN #17 of slave device 600 are provided at positions identical to PIN #1 to PIN #17 of slave device 100 illustrated in FIG. 1, respectively.

PIN #1 to PIN #17 are arranged in two rows, i.e., a first row substantially perpendicular to an insertion direction (arrow X) in which slave device 600 is inserted into a host device and a second row that is on a near side relative to the first row in the insertion direction.

Specifically, PIN #1 to PIN #9 are provided in region R1 (the first row) on a front-end side of slave device 600, and PIN #10 to PIN #17 are provided in region R2 (the second row) different from region R1. The PINs in region R1 and the PINs in region R2 form two rows.

A terminal group in region R1 is a terminal group having same layout as pin layout (not illustrated) of a legacy I/F. A terminal group in region R2 is a terminal group that is compliant with the UHS-II I/F or PCIe I/F standard.

PIN #18 of slave device 600 is provided at a position different from PIN #1 to PIN #17 of slave device 200.

Specifically, PIN #18 is provided in an empty region at an end on a line extended from the row where PIN #10 to PIN #17 are provided.

Note that the position of PIN #18 illustrated in FIG. 9 is merely an example, and the present disclosure is not limited to this.

Although an example in which slave device 600 has a single PIN (PIN #18) at a position different from PIN #1 to PIN #17 of slave device 600 has been described, the present disclosure is not limited to this. Slave device 600 may have two or more PINs at positions different from PIN #1 to PIN #17 of slave device 600.

Slave device 600 forms a signal line through PIN #18 when slave device 600 is connected to a host device. Then, for example, slave device 600 and the host device transmit and receive an identifying signal indicative of compliance with the PCIe I/F standard by using the signal line formed through PIN #18.

Hereinafter, the signal line formed through PIN #18 is referred to as a "line for identifying signal". Slave device 600 and the host device transmit and receive various signals (e.g., a control signal) to and from each other on the line for identifying signal after completion of interface initialization.

For example, slave device 600 and the host device may transmit and receive a signal requesting reset, a signal requesting a reference clock signal, a signal for power management, or an interrupt signal on the line for identifying signal.

3-2. Configuration and Operation of Removable System

[3-2-1. Configuration]

Figure 10:
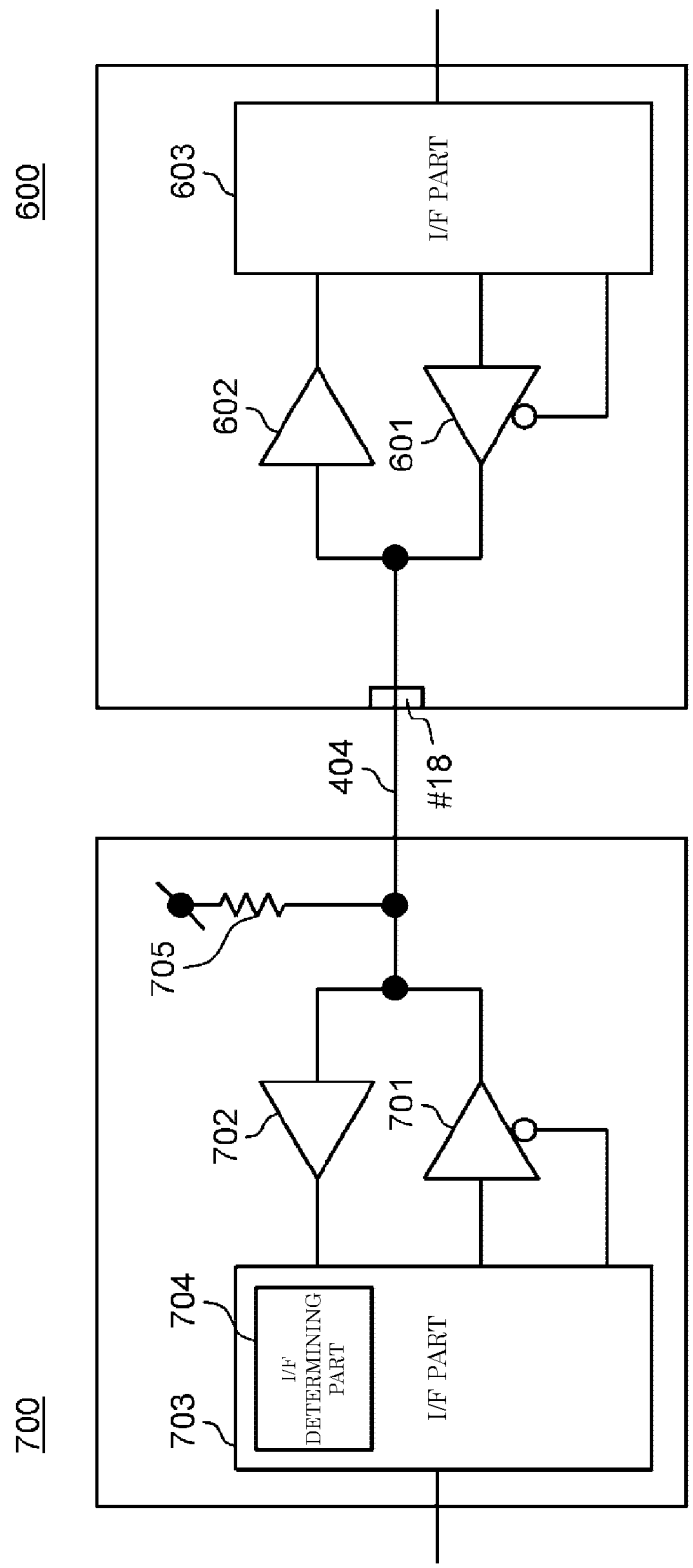
FIG. 10 is a block diagram for explaining a configuration, on a line for identifying signal, of a removable system in which a host device and a slave device are connected according to the third exemplary embodiment.

FIG. 10 is a block diagram for explaining a configuration, on the line for identifying signal, of a removable system in which host device 700 and slave device 600 are connected according to the third exemplary embodiment.

Signal lines formed through PIN #1 to PIN #17 of slave device 600 are also formed (not illustrated) during connection between host device 700 and slave device 600.

Slave device 600 has output buffer 601, input buffer 602, and I/F part 603 that are connected to line for identifying signal 404.

Host device 700 has output buffer 701, input buffer 702, I/F part 703, I/F determining part 704, and pull-up resistor 705 that are connected to line for identifying signal 404.

Slave device 600 and host device 700 transmit and receive a signal to and from each other on line for identifying signal 404, and thus host device 700 identifies whether or not slave device 600 is compliant with PCIe.

Transmission and reception of a signal on line for identifying signal 404 will be described later.

I/F part 603 and I/F part 703 are also connected through the signal lines (not illustrated) formed through PIN #1 to PIN #17 of slave device 600.

Furthermore, output buffer 701 of host device 700 has a function of a voltage controller for changing a voltage level of PIN #18.

I/F determining part 704 has a function of determining whether or not slave device 600 is compliant with the PCIe I/F standard.

[3-2-2. Flow of Signal]

Figure 11:
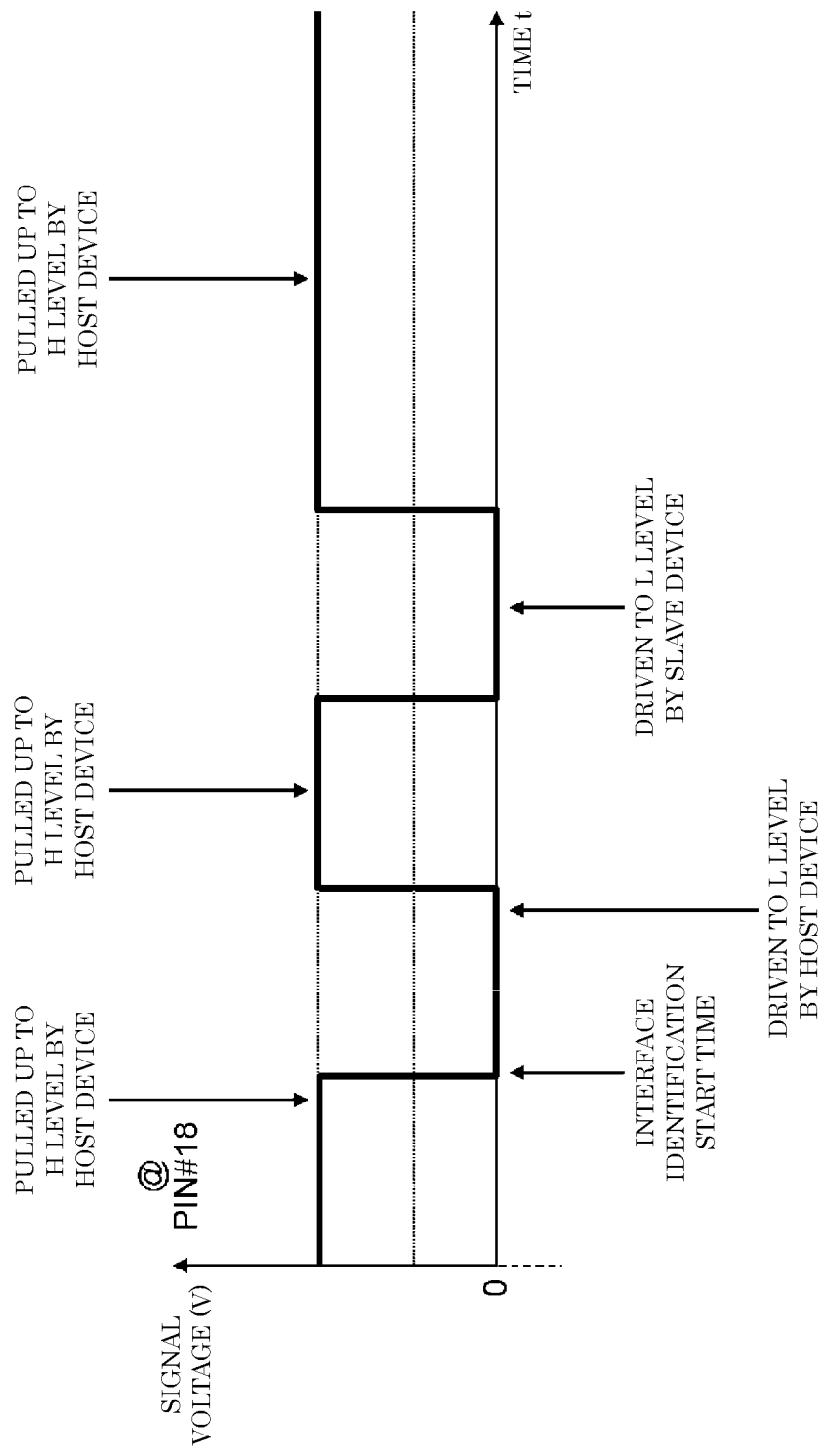
FIG. 11 illustrates an example of a signal on the line for identifying signal according to the third exemplary embodiment.

FIG. 11 illustrates an example of a signal on line for identifying signal 404 according to the third exemplary embodiment.

In FIG. 11, the vertical axis represents a signal voltage on the line for identifying signal, i.e., PIN #18, and the horizontal axis represents a time.

The line for identifying signal is pulled up to a high level (H level) by pull-up resistor 705 (see FIG. 10) after power activation. Then, after detecting insertion of slave device 600, host device 700 starts identification of an interface of slave device 600. Host device 700 drives a signal of the line for identifying signal to a low level (L level) for a predetermined period from an interface identification start time.

In the present disclosure, a state where a signal is an L level is a state where a voltage of the signal is 0 V or close to 0 V and generally means 0. Meanwhile, a state where a signal is an H level is a state where a voltage of the signal is higher than the L level and is easily distinguishable from a signal of the L level and generally means 1.

Host device 700 stops driving after driving to the L level for the predetermined period.

A level (signal voltage) of the signal after stoppage of driving is returned to the H level by pull-up resistor 705 of host device 700.

In a case where slave device 600 detects that host device 700 has driven line for identifying signal 404 to the L level, slave device 600 drives the signal of the line for identifying signal to the L level for a predetermined period.

Slave device 600 stops driving after driving to the L level for the predetermined period. A level (signal voltage) of the signal after stoppage of driving is returned to the H level by pull-up resistor 705 of host device 700.

In a case where host device 700 detects that the slave device has driven the line for identifying signal to the L level, host device 700 determines that the inserted slave device is compliant with the PCIe I/F standard.

Host device 700 executes handshake with respect to the slave device on the line for identifying signal by switching the H level and the L level as illustrated in FIG. 8 and thus determines whether or not the slave device is compliant with the PCIe I/F standard.

In a case where host device 700 determines that the slave device is compliant with the PCIe I/F standard, host device 700 executes interface initialization using the PCIe I/F and transmits and receives a data signal on line for identifying signal 404 and/or another signal line.

Meanwhile, in a case where host device 700 determines that the slave device is not compliant with the PCIe I/F standard, host device 700 determines an interface supported by the slave device on another signal line.

In this case, the line for identifying signal is not formed between host device 700 and the slave device, and therefore the slave device does not drive the signal to the L level after host device 700 drives the signal to the L level.

That is, the H level is maintained after host device 700 drives the signal to the L level. In such a case, host device 700 determines that the slave device is not compliant with the PCIe I/F standard.

The signal illustrated in FIG. 11 is merely an example, and the present disclosure is not limited to this. Furthermore, the handshake procedure is merely an example, and the present disclosure is not limited to this.

[3-2-3. Initialization Process]

Figure 12:
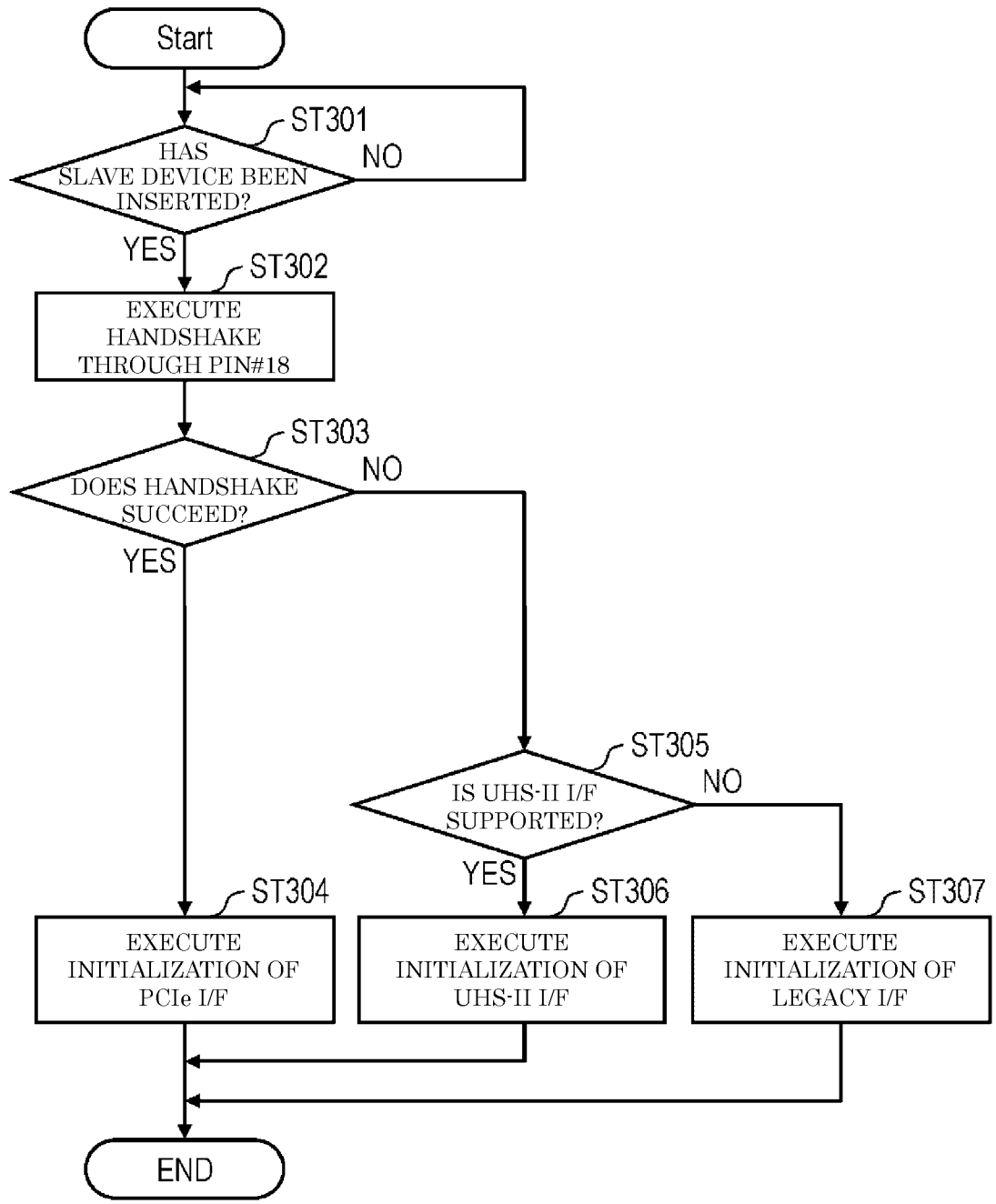
FIG. 12 is a flowchart illustrating an example of an initialization process of the host device according to the third exemplary embodiment.

FIG. 12 is a flowchart illustrating an example of the initialization process of host device 700 according to the third exemplary embodiment.

Operation illustrated in FIG. 12 is operation of initialization of an interface with the slave device executed by host device 700.

First, host device 700 determines whether or not a slave device has been inserted (ST301).

In this determining process, for example, a removal detection part of host device 700 detects whether a slave device has been removed or inserted.

In a case where a slave device has not been inserted (NO in ST301), host device 700 performs the operation in ST301 again.

In a case where a slave device has been inserted (YES in ST301), host device 700 executes handshake through PIN #18, i.e., on the line for identifying signal (ST302).

Next, host device 700 determines whether or not the handshake with the slave device on the line for identifying signal through PIN #18 has succeeded (ST303).

This determining process is executed, for example, based on whether or not a predetermined signal has been returned from the slave device.

In a case where the handshake has succeeded (YES in ST303), host device 700 determines that the inserted slave device is compliant with the PCIe I/F and executes initialization using the PCIe I/F (ST304). Then, the operation flow of the initialization ends.

Meanwhile, in a case where the handshake has not succeeded (NO in ST303), host device 700 determines that the inserted slave device is not compliant with the PCIe I/F. In this case, host device 700 determines whether or not the slave device is compliant with the UHS-III/F standard (ST305).

In a case where the slave device is compliant with the UHS-II I/F standard (YES in ST 305), host device 700 executes initialization using the UHS-II I/F (ST306). Then, the operation flow of the initialization ends.

In a case where the slave device is not compliant with the UHS-III/F standard (NO in ST 305), host device 700 executes initialization using the legacy I/F (ST307). Then, the operation flow of the initialization ends.

Through the above operation flow, host device 700 can determine an interface supported by the inserted slave device and can execute initialization according to the determination.

[3-3. Effects]

According to the third exemplary embodiment, slave device 600 is a slave device that is to be connected to a host device through a PCIe I/F (a first interface) and includes PIN #1 to PIN #17 connected through a UHS-II I/F (a second interface) and PIN #18 (a second terminal) that is provided at a position different from PIN #1 to PIN #17 and is used to determine whether or not slave device 200 is compliant with the PCIe I/F.

According to this configuration, slave device 600 can transmit and receive a signal for causing host device 700 to identify an interface with which slave device 600 is compliant through PIN #18. This allows the host device to easily identify whether or not the slave device is connected to the host device through the PCIe I/F.

After completing interface initialization, slave device 600 can transmit and receive a signal such as a signal requesting reset, a signal requesting a reference clock signal, a signal for power management, or an interrupt signal through PIN #18. This can assist transmission and reception of a signal through PIN #1 to PIN #17, thereby achieving high-speed data transmission.

Although a case where PIN #18 (the second terminal) is used as a terminal for transmission and reception of a signal has been described in the present exemplary embodiment, the present disclosure is not limited to this.

PIN #18 (the second terminal) may be used as a terminal for supplying power from host device 700 to slave device 600.

The case where PIN #18 is used as a terminal for supplying power from a host device to a slave device is described below as a fourth exemplary embodiment.

Fourth Exemplary Embodiment

[4-1. Pin Layout of Slave Device]

A pin layout of slave device 800 according to the fourth exemplary embodiment is similar to the pin layout of slave device 600 illustrated in FIG. 6, and therefore detailed description thereof is omitted.

[4-2. Configuration and Operation of Removable System]

[4-2-1. Configuration]

Figure 13:
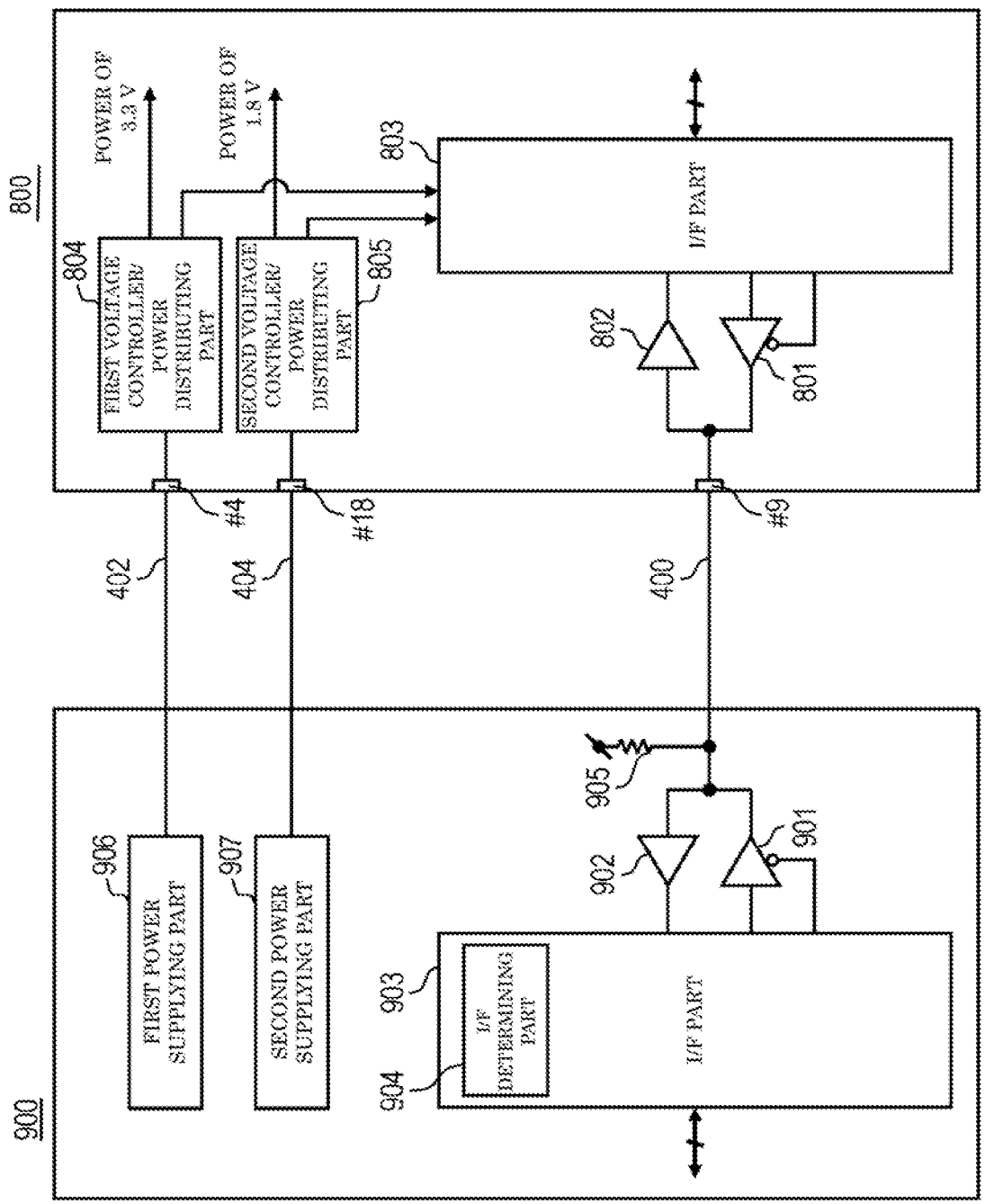
FIG. 13 is a block diagram for explaining a configuration, on a line for identifying signal, of a removable system in which a host device and a slave device are connected according to a fourth exemplary embodiment.

FIG. 13 is a block diagram for explaining a configuration of a removable system in which host device 900 and slave device 800 are connected according to the fourth exemplary embodiment.

FIG. 13 illustrates VDD1 line 402 that is a signal line formed during connection between slave device 800 and host device 900 and through which power is supplied through PIN #4 of slave device 800 and DAT2 line 400 formed through PIN #9.

Furthermore, FIG. 13 illustrates signal line 404 formed through PIN #18 of slave device 800. As described above, in the fourth exemplary embodiment, PIN #18 is used as a terminal for supplying power from host device 900 to slave device 800. Hereinafter, signal line 404 is referred to as VDD3 line 404.

Signal lines connected through terminals other than PIN #4, PIN #9, and PIN #18 of slave device 800 are also formed (not illustrated) during connection between host device 900 and slave device 800.

Slave device 800 has output buffer 801, input buffer 802, and I/F part 803 that are connected to DAT2 line 400.

Furthermore, slave device 800 has first voltage controller/power distributing part 804 that supplies power of 3.3 V supplied from host device 900 on VDD1 line 402 to I/F part 803 and the like and second voltage controller/power distributing part 805 that supplies power of 1.2V supplied from host device 900 on VDD3 line 404 to I/F part 803 and the like.

Host device 900 has output buffer 901, input buffer 902, I/F part 903, I/F determining part 904, and pull-up resistor 905 that are connected to DAT2 line 400. Furthermore, host device 900 has first power supplying part 906 that supplies power of 3.3 V to slave device 800 on VDD1 line 402 and second power supplying part 907 that supplies power of 1.2V to slave device 800 on VDD3 line 404.

Second power supplying part 907 has a function of a voltage controller that changes a voltage level of PIN #18 and supplies power to slave device 800 by applying a voltage to PIN #18.

Although a structure in which first power supplying part 906 and second power supplying part 907 are independent of each other has been described in the fourth exemplary embodiment, the present disclosure is not limited to this, and first power supplying part 906 and second power supplying part 907 may be integral with each other as in the case of the power supplying part according to the second exemplary embodiment.

I/F determining part 904 has a function of determining whether or not slave device 800 is compliant with the PCIe I/F standard.

For example, as illustrated in FIG. 13, host device 900 supplies power of 3.3 V to the signal line of PIN #4 and supplies power of 1.2 V to the signal line of PIN #18. In a case where slave device 800 detects supply of both of the two types of power, slave device 800 controls a signal on the signal line of PIN #9, for example, as described below.

[4-2-2. Flow of Signal]

Figure 14:
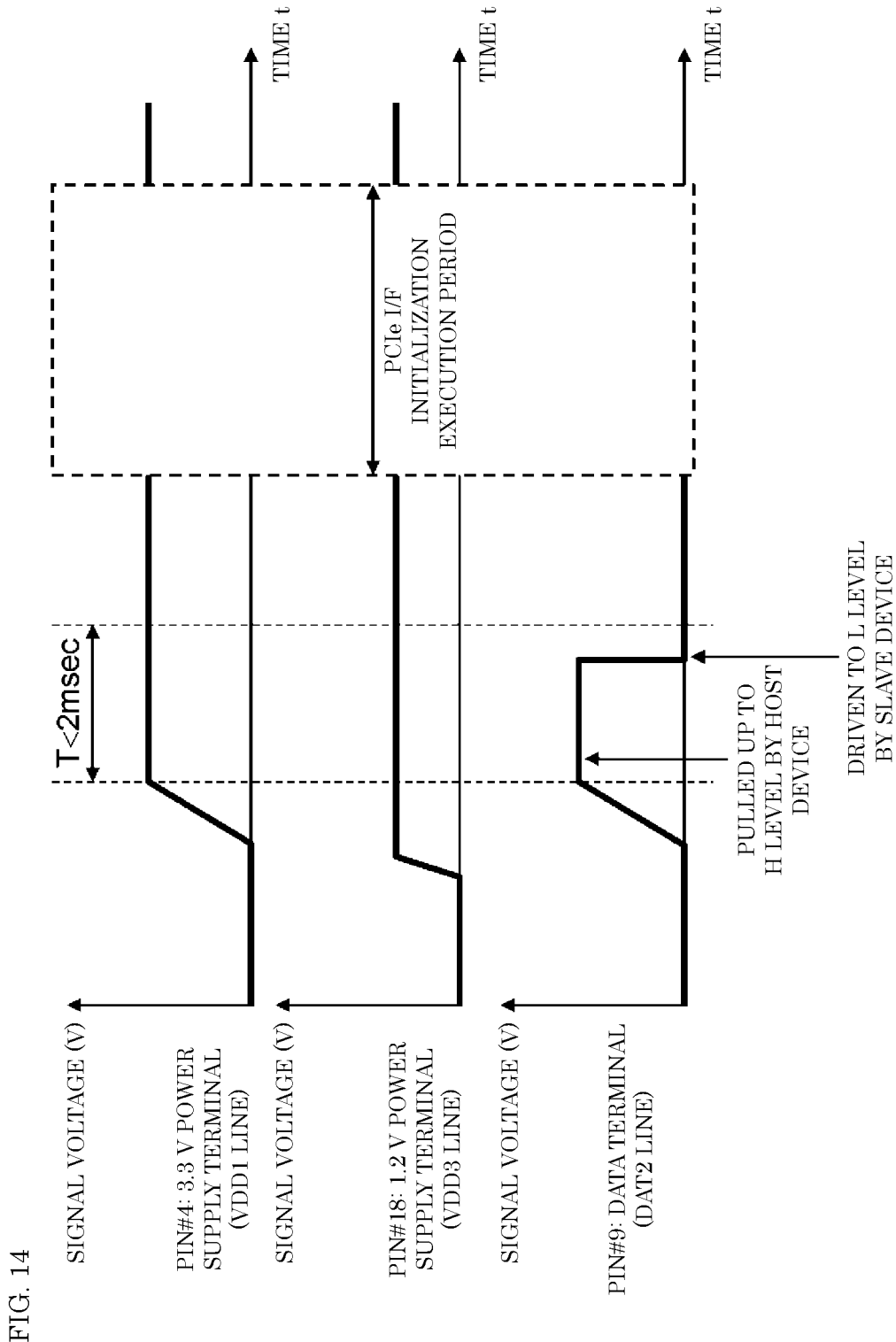
FIG. 14 illustrates an example of signals on the line for identifying signal according to the fourth exemplary embodiment.

FIG. 14 illustrates an example of signals on a line for identifying signal according to the fourth exemplary embodiment.

FIG. 14 illustrates an example of signals of VDD1 line 402, VDD3 line 404, and DAT2 line 400. The vertical axis of each line represents a signal voltage, and the horizontal axis represents a time.

When slave device 800 is connected to host device 900, host device 900 supplies power of 3.3 V to the signal line (VDD1 line 402) of PIN #4 and supplies power of 1.2 V to the signal line (VDD3 line 404) of PIN #18. On the signal line (DAT2 line 400) of PIN #9, a level of a signal (signal voltage) is pulled up to an H level by pull-up resistor 905.

In a case where slave device 800 detects supply of both of the two types of power, slave device 800 drives the signal line (DAT2 line 400) of PIN #9 to an L level within predetermined period T (e.g., T<2 msec) after both of the two types of power become stable.

In a case where host device 900 detects that the level of the signal (signal voltage) on the DAT2 line has become an L level, host device 900 determines that inserted slave device 800 is compliant with the PCIe I/F standard. Then, initialization of the PCIe I/F is executed between host device 900 and slave device 800.

[4-3. Effects]

According to the configuration described in the fourth exemplary embodiment, the host device can easily identify whether or not slave device 800 is connected to the host device through the PCIe I/F.

Note that the voltages of the power described in the fourth exemplary embodiment are merely an example, and the present disclosure is not limited to this. Although an example in which slave device 800 drives the signal line (DAT2 line) of PIN #9 to an L level in a case where slave device 800 detects supply of both of the two types of power has been described, the present disclosure is not limited to this. Operation performed by slave device 800 in a case where slave device 800 detects supply of both of the two types of power may be operation performed through a terminal other than PIN #9.

[Other Remarks]

Although a case where an SD card is used as a slave device has been described in each of the above exemplary embodiments, the present disclosure is not limited to this and is applicable to other slave devices such as a Compact-Flash. Furthermore, although a PCIe I/F has been described as an example of a newly introduced interface in each of the above exemplary embodiments, the present disclosure is not limited to this.

INDUSTRIAL APPLICABILITY

The present disclosure is suitably used for a slave device and a host device that support a newly introduced interface.

What is claimed is:

1. A slave device that is to be connected to a host device through at least one of a first interface standard and a second interface standard, the slave device comprising:

a first terminal group used for the first interface standard and a second terminal group used for the second interface standard, the first terminal group and the second terminal group being provided at positions identical to terminal groups of another slave device to be connected through a third interface standard different from the first interface standard and the second interface standard; and a signal input and output part that supplies a signal to a predetermined terminal in the first terminal group within a predetermined period from supply of power to the slave device, the signal notifying the host device whether the second terminal group is compliant with the second interface standard.

2. The slave device according to claim 1, wherein the signal input and output part transmits a control signal through the predetermined terminal in the first terminal group after supplying the signal for notifying the host device whether the second terminal group is compliant with the second interface standard.

3. The slave device according to claim 2, wherein the control signal is at least one of a signal requesting reset, a signal requesting a reference clock signal, a signal for power management, and an interrupt signal and is transmitted to the host device.

4. The slave device according to claim 1, wherein the second interface standard is Peripheral Component Interconnect express (PCIe), and the third interface standard is Ultra High Speed-II (UHS-II).

5. A slave device that is to be connected to a host device through at least one of a first interface standard and a second interface standard, the slave device comprising:
a first terminal group used for the first interface standard and a second terminal group used for the second interface standard, the first terminal group and the second terminal group being provided at positions identical to terminal groups of another slave device to be connected through a third interface standard different from the first interface standard and the second interface standard; and
a signal input and output part that, in a case where power is supplied to the slave device and it is detected that a signal level of a predetermined first terminal is a predetermined level, supplies a signal to a second terminal in the first terminal group different from the predetermined first terminal, the signal notifying the host device whether the second terminal group is compliant with the second interface standard.

6. The slave device according to claim 5, wherein the signal input and output part transmits a control signal through the predetermined terminal in the first terminal group after supplying the signal for notifying the host device whether the second terminal group is compliant with the second interface standard.

7. The slave device according to claim 6, wherein the control signal is at least one of a signal requesting reset, a signal requesting a reference clock signal, a signal for power management, and an interrupt signal and is transmitted to the host device.

8. The slave device according to claim 5, wherein the second interface standard is Peripheral Component Interconnect express (PCIe), and the third interface standard is Ultra High Speed-II (UHS-II).

9. A slave device that is to be connected to a host device through a first interface standard, the slave device comprising:
a first terminal group that is provided at a position identical to a terminal group of another slave device to be connected through a second interface standard different from the first interface standard; and
a second terminal that is provided at a position different from the first terminal group and is used for a determination whether the slave device is compliant with the first interface standard.

10. The slave device according to claim 9, wherein a control signal is transmitted through the second terminal after the determination.

11. The slave device according to claim 10, wherein the control signal is at least one of a signal requesting reset, a signal requesting a reference clock signal, a signal for power management, and an interrupt signal and is transmitted to the host device.

12. The slave device according to claim 9, wherein power is supplied through the second terminal.

13. The slave device according to claim 9, wherein the first terminal group is arranged in two rows that are a first row substantially perpendicular to an insertion direction in which the slave device is inserted into the host device and a second row that is on a near side relative to the first row in the insertion direction; and the second terminal is provided on a line extended from the second row.

14. The slave device according to claim 9, wherein the first interface standard is Peripheral Component Interconnect express (PCIe), and the second interface standard is Ultra High Speed-II (UHS-II).

15. A host device that is to be connected to a slave device through at least one of a first interface standard and a second interface standard, the host device comprising:
a signal input and output part that is connected to a first terminal group and a second terminal group that are provided at positions identical to terminal groups of another slave device to be connected through a third interface standard different from the first interface standard and the second interface standard and keeps a voltage level of a predetermined terminal in the first terminal group constant or changes the voltage level; and
a determining part that determines whether an interface standard connected to the slave device is the second interface standard, based on a signal received from the slave device through the signal input and output part.

16. The host device according to claim 15, wherein the signal input and output part supplies power to the slave device by applying a voltage to the predetermined terminal.

* * * * *